US012673856B2

(12) United States Patent
Decato et al.

(10) Patent No.: US 12,673,856 B2
(45) Date of Patent: Jul. 7, 2026

(54) MATERIAL HANDLING LIFT

(71) Applicant: Southworth Products Corporation, Falmouth, ME (US)

(72) Inventors: Kim Decato, Auburn, ME (US); Randall Dickinson, Kennebunk, ME (US); Dave Roberts, Standish, ME (US)

(73) Assignee: Southworth International Group, Inc., Falmouth, ME (US)

( * ) Notice: Subject to any disclaimer, the term of this patent is extended or adjusted under 35 U.S.C. 154(b) by 628 days.

(21) Appl. No.: 18/099,385

(22) Filed: Jan. 20, 2023

(65) Prior Publication Data

US 2023/0227296 A1  Jul. 20, 2023

Related U.S. Application Data

(60) Provisional application No. 63/266,956, filed on Jan. 20, 2022.

(51) Int. Cl.
*B66F 9/04* (2006.01)
*B66F 17/00* (2006.01)

(52) U.S. Cl.
CPC ................ *B66F 9/04* (2013.01); *B66F 17/00* (2013.01)

(58) Field of Classification Search
CPC ..... E06B 2009/2447; E06B 2009/2452; E06B 2009/2458; A61G 7/015; B66F 9/04
See application file for complete search history.

(56) References Cited

U.S. PATENT DOCUMENTS

| | | | | | | |
|---|---|---|---|---|---|---|
| 4,063,619 | A | * | 12/1977 | Drews | B66F 7/04 | 187/274 |
| 4,219,103 | A | * | 8/1980 | Harsacky | B60P 1/4471 | 187/217 |
| 4,457,402 | A | * | 7/1984 | Del Vecchio | B66B 9/0869 | 105/449 |
| 4,482,284 | A | * | 11/1984 | Robbins | A61G 3/062 | 414/539 |
| 4,499,541 | A | * | 2/1985 | Yuki | B66F 9/0755 | 377/17 |
| 4,551,056 | A | * | 11/1985 | Risner | B60P 1/4457 | 414/539 |
| 4,782,641 | A | | 11/1988 | Manenti et al. | | |
| 5,040,936 | A | * | 8/1991 | Rhea | A61G 3/062 | 187/901 |
| 5,499,694 | A | * | 3/1996 | Dorn | B64F 1/31 | 414/921 |

(Continued)

FOREIGN PATENT DOCUMENTS

| | | | | | |
|---|---|---|---|---|---|
| GB | 774481 | A | * | 5/1957 | B66F 9/16 |

*Primary Examiner* — Daniel P Cahn
(74) *Attorney, Agent, or Firm* — Secant IP, PLLC

(57) ABSTRACT

A material handling lift including safety features for reducing the risk of injury to a user. The features may include one or more of: a roller shade for covering components of a mast, a scanner for detecting people in a protected area of the lift, a fan for preventing accumulation of dust on the scanner, spacers between a lift platform and a side guard panel, perforated side guard panels to allow viewing of a space under the lift, entrance guards to keep people away from the side and front of the lift, a power unit with dual redundant locking valves, and tamper-resistant fasteners for fastening a rear panel to a mast.

25 Claims, 13 Drawing Sheets

(56) References Cited

U.S. PATENT DOCUMENTS

| | | | | | |
|---|---|---|---|---|---|
| 6,043,741 | A * | 3/2000 | Whitmarsh | A61G 3/062 | 340/556 |
| 6,119,815 | A * | 9/2000 | Ziegler | B66F 17/00 | 187/269 |
| 6,257,372 | B1 * | 7/2001 | Schirmer | B66B 9/0853 | 187/269 |
| 6,530,394 | B2 | 3/2003 | Pai | | |
| 7,086,361 | B2 | 8/2006 | Ritter | | |
| 7,926,618 | B2 * | 4/2011 | Zuercher | B60P 1/4471 | 187/242 |
| 9,528,313 | B1 * | 12/2016 | Arimilli | E06B 9/34 | |
| 10,309,154 | B2 * | 6/2019 | Horn | E06B 11/00 | |
| 12,303,305 | B1 * | 5/2025 | Cao | A61B 5/1115 | |
| 2003/0213653 | A1 * | 11/2003 | Morris | A61G 3/067 | 187/269 |
| 2004/0265106 | A1 * | 12/2004 | Charvet | B66F 9/12 | 414/623 |
| 2005/0270147 | A1 * | 12/2005 | Lewis | B60K 28/08 | 340/439 |
| 2006/0182581 | A1 * | 8/2006 | Murray | B66B 9/0869 | 414/541 |
| 2007/0144686 | A1 * | 6/2007 | Drew | E06B 9/34 | 160/170 |
| 2008/0121349 | A1 * | 5/2008 | De La Cruz | B66B 13/303 | 160/23.1 |
| 2008/0308357 | A1 * | 12/2008 | Coble | B66B 9/0807 | 187/200 |
| 2008/0308358 | A1 * | 12/2008 | Zuercher | B66B 9/0853 | 187/200 |
| 2009/0180843 | A1 * | 7/2009 | Jackson | B66F 7/00 | 187/269 |
| 2012/0125546 | A1 * | 5/2012 | Cooper | A62C 2/10 | 160/241 |
| 2013/0075203 | A1 * | 3/2013 | Sayles | B66F 11/04 | 187/390 |
| 2013/0236285 | A1 * | 9/2013 | Maurissen | B66F 9/0755 | 414/800 |
| 2015/0267465 | A1 * | 9/2015 | Knowles | E05F 15/603 | 160/9 |
| 2016/0075543 | A1 * | 3/2016 | Lombardo | B66F 11/044 | 187/247 |
| 2017/0269598 | A1 * | 9/2017 | Bardinet | G05D 1/0274 | |
| 2017/0335583 | A1 * | 11/2017 | Moran | E04F 11/1865 | |
| 2020/0056424 | A1 * | 2/2020 | Farnes | E06B 9/68 | |
| 2020/0156100 | A1 * | 5/2020 | Booher | B05B 12/04 | |
| 2020/0231079 | A1 * | 7/2020 | Lai | B62B 3/02 | |
| 2020/0307977 | A1 * | 10/2020 | Hasegawa | B66F 9/082 | |
| 2022/0119237 | A1 * | 4/2022 | Eisler | G05D 16/2066 | |
| 2023/0248592 | A1 * | 8/2023 | Dupuy | A61G 3/062 | 414/540 |
| 2023/0381955 | A1 * | 11/2023 | Bacon | G05B 19/41895 | |
| 2024/0336456 | A1 * | 10/2024 | Talonen | B66B 13/285 | |
| 2025/0059011 | A1 * | 2/2025 | Faconti | G01S 17/42 | |
| 2025/0370249 | A1 * | 12/2025 | Davis, Jr. | G02B 27/0006 | |

* cited by examiner

MATERIAL HANDLING LIFT

CROSS-REFERENCE TO RELATED APPLICATIONS

The present application claims the benefit of the filing date of U.S. Provisional Application Ser. No. 63/266,956, filed Jan. 20, 2022, the entire teachings of which application is hereby incorporated herein by reference.

FIELD

The present disclosure relates to lifts, and, more particularly, to a material handling lift.

BACKGROUND

A wide variety of material handling lifts are well known. In general, material handling lifts may transfer materials and/or people from one position to another position, e.g., by vertically lifting the material, moving the material horizontally, rotating the material, etc. For example, a vertical lift may be configured as a roll-on lift configured with a platform that moves between lowered and raised positions, e.g., using hydraulic power. When the platform is in the lowered position, a user may move one or more pallets or other containers onto the platform and then energize the lift to raise the platform and the pallet thereon to the raised position. The user may then roll the pallets or other containers off the platform.

One challenge with material handling lifts is the potential for injury to users caused by the moving components. In an effort to avoid injury, users may be trained in the safe operation of the lift. Training of users can be time consuming and costly and, despite the training, human error in operation of material handling lifts may still result in injury.

BRIEF DESCRIPTION OF THE DRAWINGS

For a better understanding of the present invention, together with other objects, features and advantages, reference should be made to the following detailed description which should be read in conjunction with the accompanying figures, wherein.

DETAILED DESCRIPTION

Figure 1:
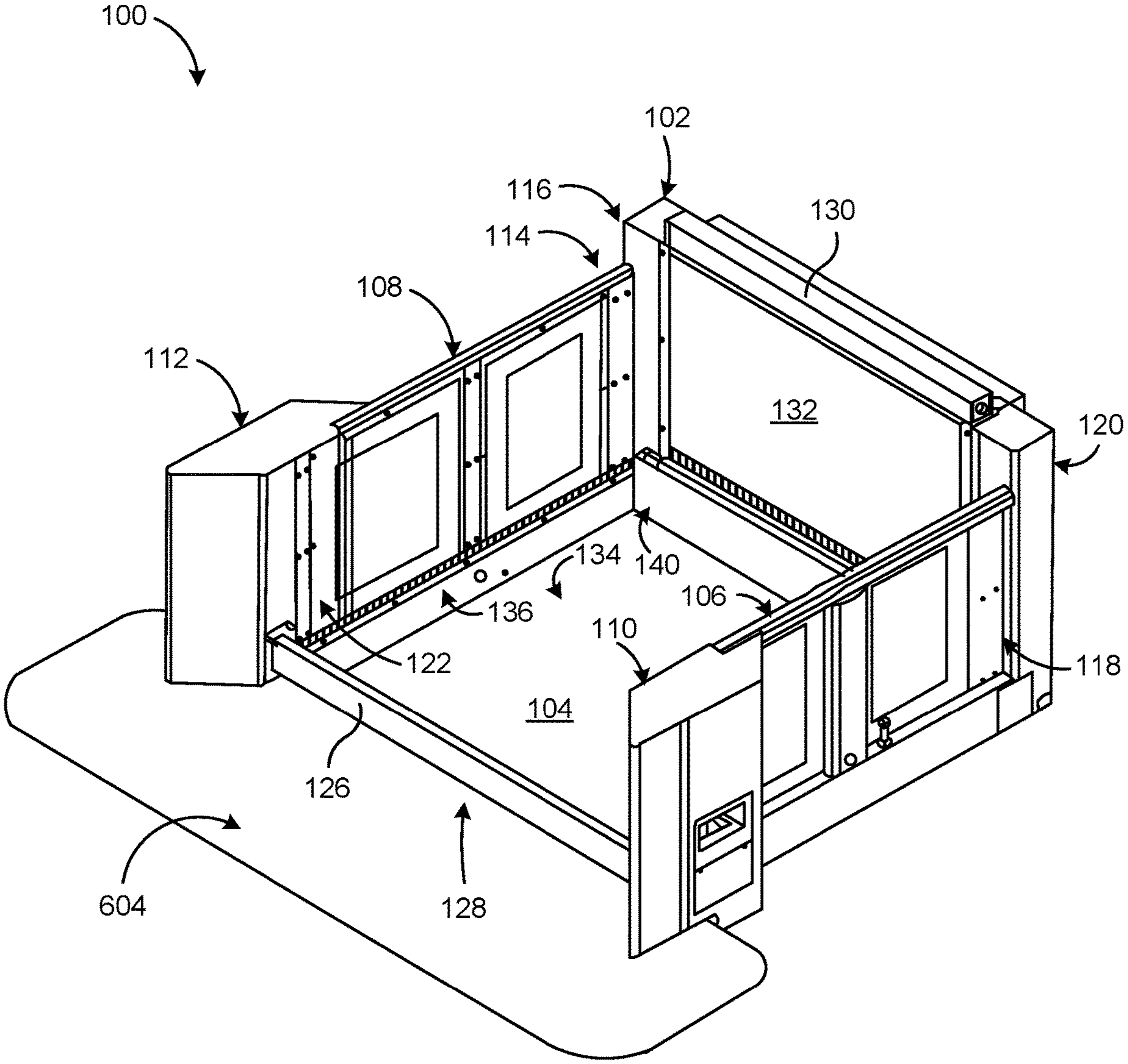
FIG. 1 is top perspective view of one example of a vertical lift consistent with the present disclosure with a platform in a lowered position.

The present disclosure is not limited in its application to the details of construction and the arrangement of components set forth in the following description or illustrated in the drawings. The examples described herein may be capable of other embodiments and of being practiced or being carried out in various ways. Also, the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

In general, a material handling lift consistent with the present disclosure includes one or more safety features for preventing injury of a user during operation. In some embodiments, the lift may include a roller shade that blocks access to moving parts. In a vertical lift configuration, for example, the lift may include a roller shade positioned between the platform and the lift mast. The roller shade may raise and lower with the lift platform to block the user from inadvertently extending a body part, e.g., a limb or fingers, into spaces between moving components of the mast or between the platform and the mast that would otherwise be exposed in the absence of the roller shade.

In some embodiments, a lift consistent with the present disclosure may include a scanner, e.g., a laser scanner, for detecting presence of person in a protected area, e.g., a potentially dangerous area, of the lift. In a vertical lift configuration, for example, the scanner may detect presence of a person at the front of the vertical lift and disable operation if a person is detected in the front of the lift. This feature may reduce the possibility of injury to a person during operation of the lift.

In some embodiments, the scanner may be housed within the lift, e.g., within an entrance guard located at the entrance to a lift platform and a fan may be disposed adjacent the scanner. The fan may be configured to force air over the scanner to prevent dust from settling on the scanner and disrupting operation of the scanner. In some embodiments, the scanner may be visible through a window in the lift to allow a user to observe that the scanner is covered with dust. The user can then clean the scanner to ensure proper operation.

In some embodiments, a lift consistent with the present disclosure may include a floating spacer between a moving component of the lift and a stationary component of the lift. In a vertical lift configuration, for example, the floating spacer may be located between the platform and the side panels to block spaces that would otherwise provide pinch points between the platform and side panels. This feature may reduce the possibility of injury to a person caused by placing a body part in the pinch points.

In some embodiments, a vertical lift consistent with the present disclosure may include side panels with perforations therein. The perforations allow a user located outside of the lift to view the interior of the lift through the side panels to determine if person is underneath the platform. If a person is underneath the platform, a user can disable operation of the lift until the person is no longer underneath the platform to prevent possible injury to the user as the lift is lowered from a raised position.

In some embodiments, a vertical lift consistent with the present disclosure may include platform entrance guards on the sides of the platform entrance. The entrance guards may be shaped to keep people back and away from the platform entrance to prevent them from reaching into the platform area during operation. This feature may reduce the possibility of injury to a person caused by placing a body part beneath the platform or into other pinch points as the platform lowers. The front surface of the entrance guards may also be beveled inward toward the platform to prevent people or material from catching on the entrance guards when entering or exiting the platform area.

In some embodiments, the power unit located in the mast and configured to drive the moving part of the lift, e.g., a platform or other component, may include a hydraulic cylinder and dual redundant locking valves to prevent hydraulic fluid from leaving the cylinder when a person is detected in a dangerous area of the lift, e.g., by the scanner. This feature can prevent operation of the lift when operation would otherwise potentially cause injury to a person. In some embodiments, the mast cover enclosing the power unit may be secured to the mast using tamper-resistant fasteners to prevent a person from accessing pinch points and/or electrical components within the mast that could potentially cause injury.

A lift consistent with the present disclosure may include any one or more of these safety features. For ease of explanation only, these features will be shown and described herein in connection with a front-entry vertical lift configuration consistent with the present disclosure wherein the vertical lift includes all of the features. It is to be understood, however, that a lift consistent with the present disclosure may include any one or more of these safety features and may be provided in any lift configuration, e.g., in a side entry vertical lift configuration, in a lift configuration without sides, in a lift configuration that moves materials in horizontal or angular direction, in a lift configuration that rotates materials, etc. The example embodiments shown and described herein are thus provided by way of illustration, not limitation.

FIG. 1 shows an example embodiment of a lift 100 consistent with the present disclosure in a front-entry vertical lift configuration. The illustrated example embodiment 100 includes a mast 102, a platform 104, a right side guard panel 106, a left side guard panel 108, a right side entrance guard 110 and a left side entrance guard 112. A first end 114 of the left side guard panel 108 is coupled to a left side 116 of the mast 102 and a first end 118 of the right side guard panel 106 is coupled to a right side 120 of the mast 102 to enclose the platform 104 on three sides. The left side entrance guard 112 is coupled to a second end 122 of the left side guard panel 108 and the right side entrance guard 110 is coupled to a second end 124 (shown in FIG. 5A) of the right side guard panel 106. When the lift 100 is assembled, the lift 100 forms a rigid free-standing structure. In some embodiments, the guard panels may be attached using tamper-resistant fasteners.

To prevent damage to the lift 100 when moving or shipping the lift 100, a removable rigid brace 126 may be coupled between the second ends of the left and right side guard panel 106, 108. In the illustrated example embodiment, the left and right side guard panel 108, 106 each include a brace receptacle for removably receiving an end of the brace. The rigid brace may be installed into the receptacles in the left and right side guard panel 108, 106 and removed prior to operation of the lift 100.

Figure 2:
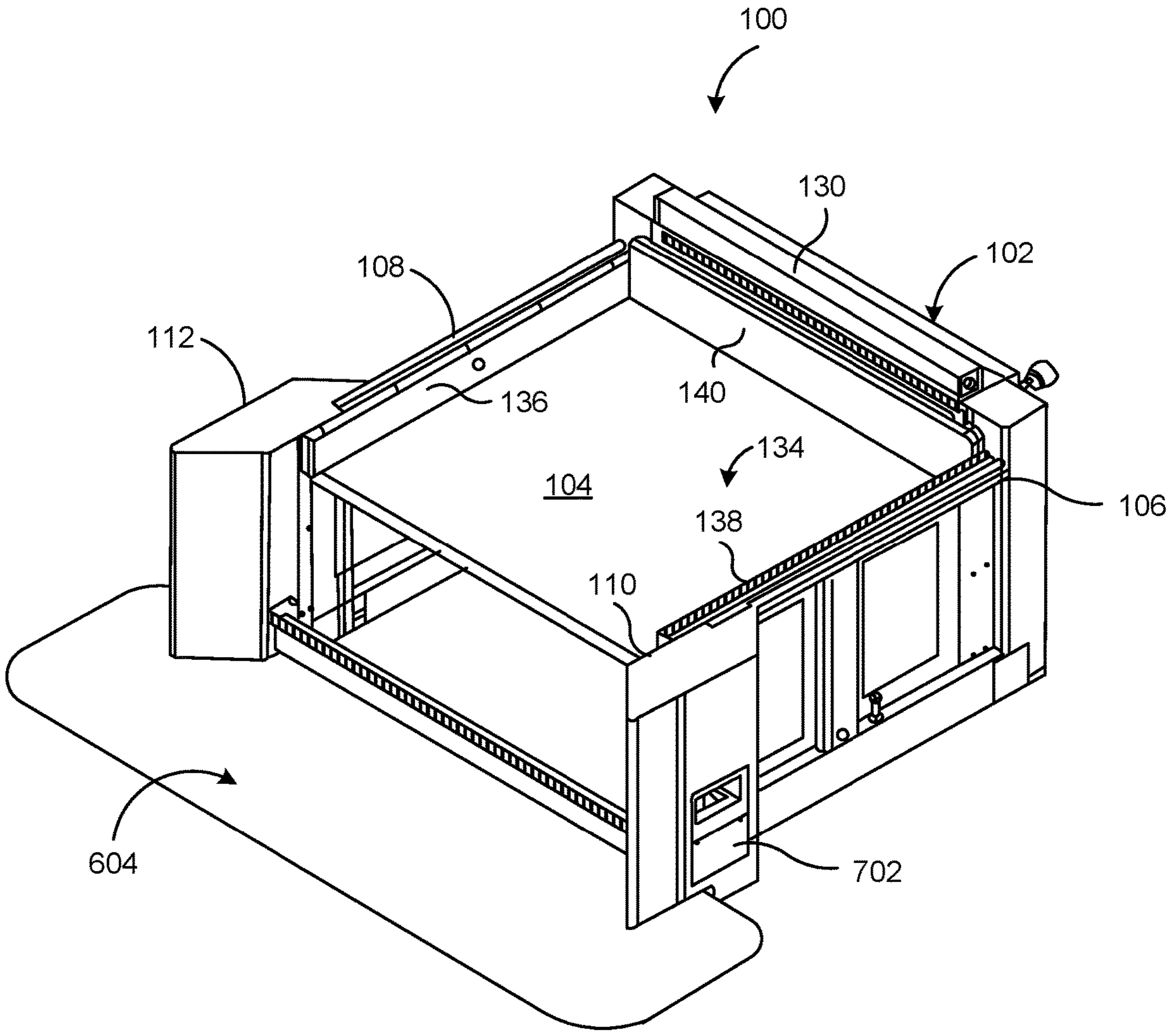
FIG. 2 is a top perspective view of the vertical lift shown in FIG. 1 with the platform in a raised position.

In the illustrated front-entry configuration, a front side 128 of the lift 100 is open to allow access to the platform 104 for loading and unloading material onto/from the platform 104. The mast 102 houses a power unit that uses hydraulic power for driving a platform 104 from a lowered position, as shown in FIG. 1 to a raised position as shown in FIG. 2. A user may selectively control operation of the power unit by operation of user controls placed on the exterior of the lift 100, e.g., on one of the side guard panels 106, 108, to place the platform 104 and any materials loaded thereon in the lowered position or the raised position.

The illustrated example embodiment includes a roller shade housing 130 coupled to a top of the mast 102 adjacent front surface of the mast 102, i.e., the surface of the mast 102 adjacent the platform 104. The roller shade housing 130 may include a roller shade 132 extendably and retractably disposed therein. The roller shade 132 may be constructed from a heavy-duty fabric and may extend across the width of the platform 104.

The roller shade 132 may have a first end coupled to a spring biased roller that is rotatably mounted inside the roller shade housing 130. The spring biases the roller shade 132 to roll around the roller and into the roller shade housing 130. An opposite end of the roller shade 132 may be coupled to the platform 104.

When the platform 104 is in a raised position, as shown in FIG. 2, the roller shade 132 is substantially retracted within the roller shade housing 130. As the platform 104 is lowered to the lowered position, the roller shade 132 is drawn from the roller shade housing 130 by downward movement of the platform 104 and is positioned between the platform 104 and the front surface of the mast 102. The roller shade 132 thus blocks the user from inadvertently extending a body part, e.g., a limb or fingers, into spaces between moving components of the mast 102 or between the platform 104 and the mast 102 that would otherwise be exposed at the front surface of the mast 102 in the absence of the roller shade 132. As the platform 104 is returned to the raised position, the roller shade 132 retracts into the roller shade housing 130.

In the illustrated example embodiment, the platform 104 includes a base 134, a left side wall 136 coupled to the base 134 and positioned adjacent the left side guard panel 108, a right side 138 coupled to the base 134 and positioned adjacent the right side guard panel 106, and a mast end 140 coupled to the base 134 and positioned adjacent the front surface of the mast 102. The first end of the left side wall 136 is coupled to one end of the mast end 140 and a first end of the right side wall 138 is coupled to an opposite end of the mast end 140. The second ends of the left and right side walls 136, 138 are positioned adjacent the front entry of the 100, which as an open side of the platform 104.

Figure 3:
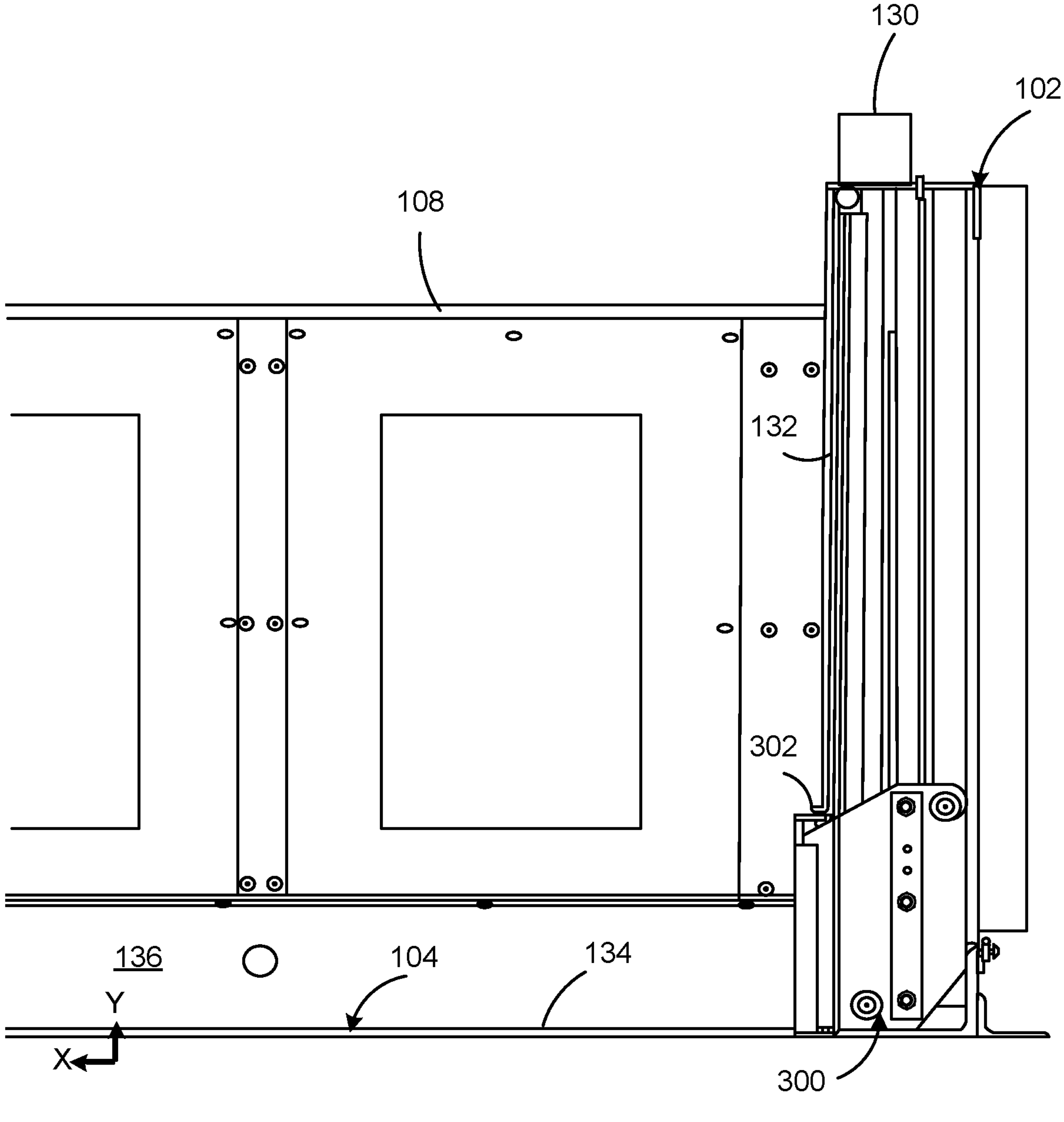
FIG. 3 is sectional view of a portion of the vertical lift shown in FIG. 1 taken through the mast and the entry of the lift, showing a roller shade in a lowered position.
Figure 4:
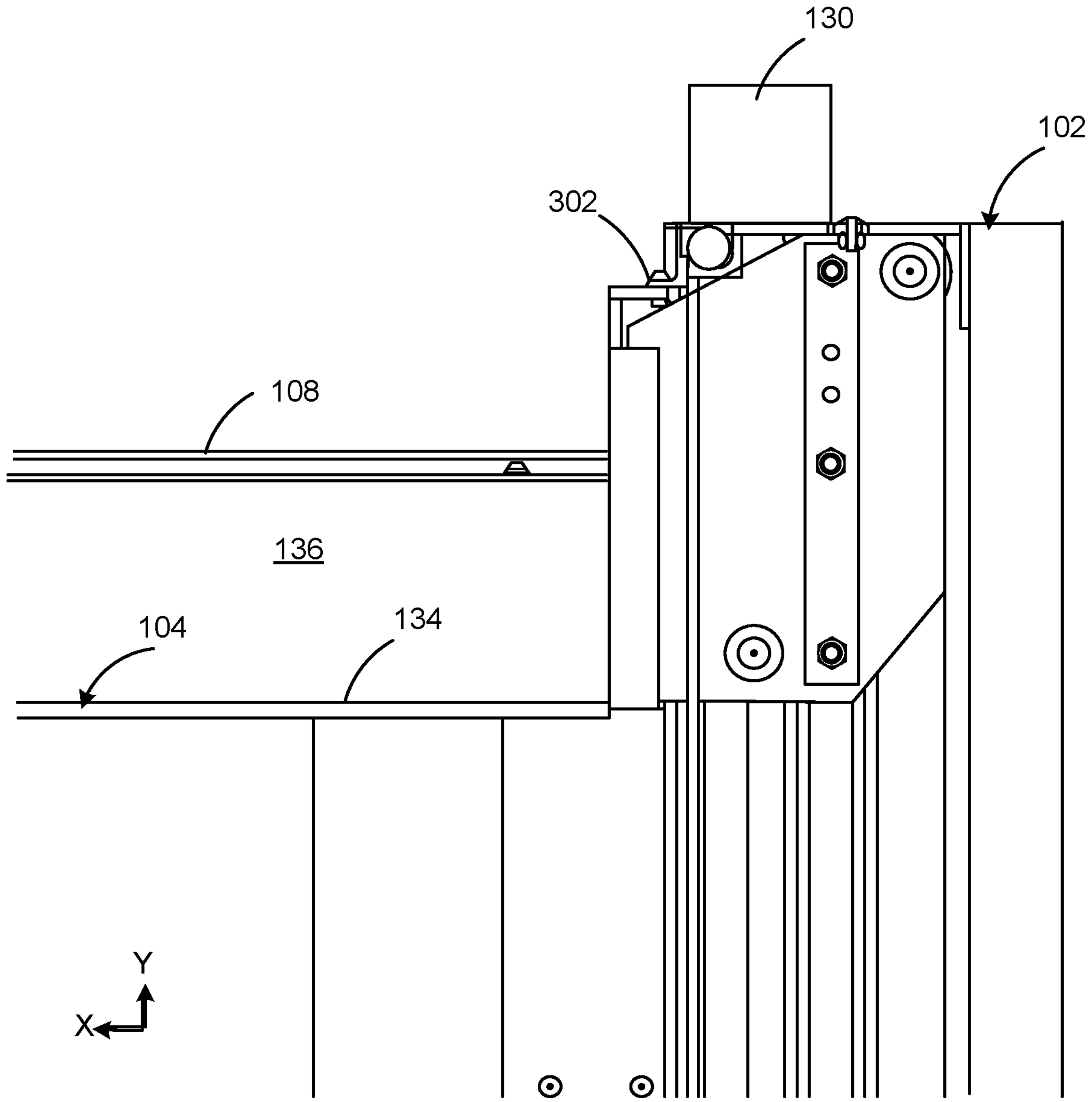
FIG. 4 is sectional view of a portion of the vertical lift shown in FIG. 1 taken through the mast and the entry of the lift, showing a roller shade in a raised position.

As shown in FIGS. 3 and 4, which are sectional views of a portion of the lift 100 showing the lift 100 in the lowered and raised configurations, respectively, the platform 104 may be coupled to the mast 102 through a carriage 300. The carriage 300 may vertically translate along the mast 102 under hydraulic power provided by the mast power unit. Translation of the carriage 300 along the mast 102 moves the platform 104 between the raised and lowered positions.

Figure 5A:
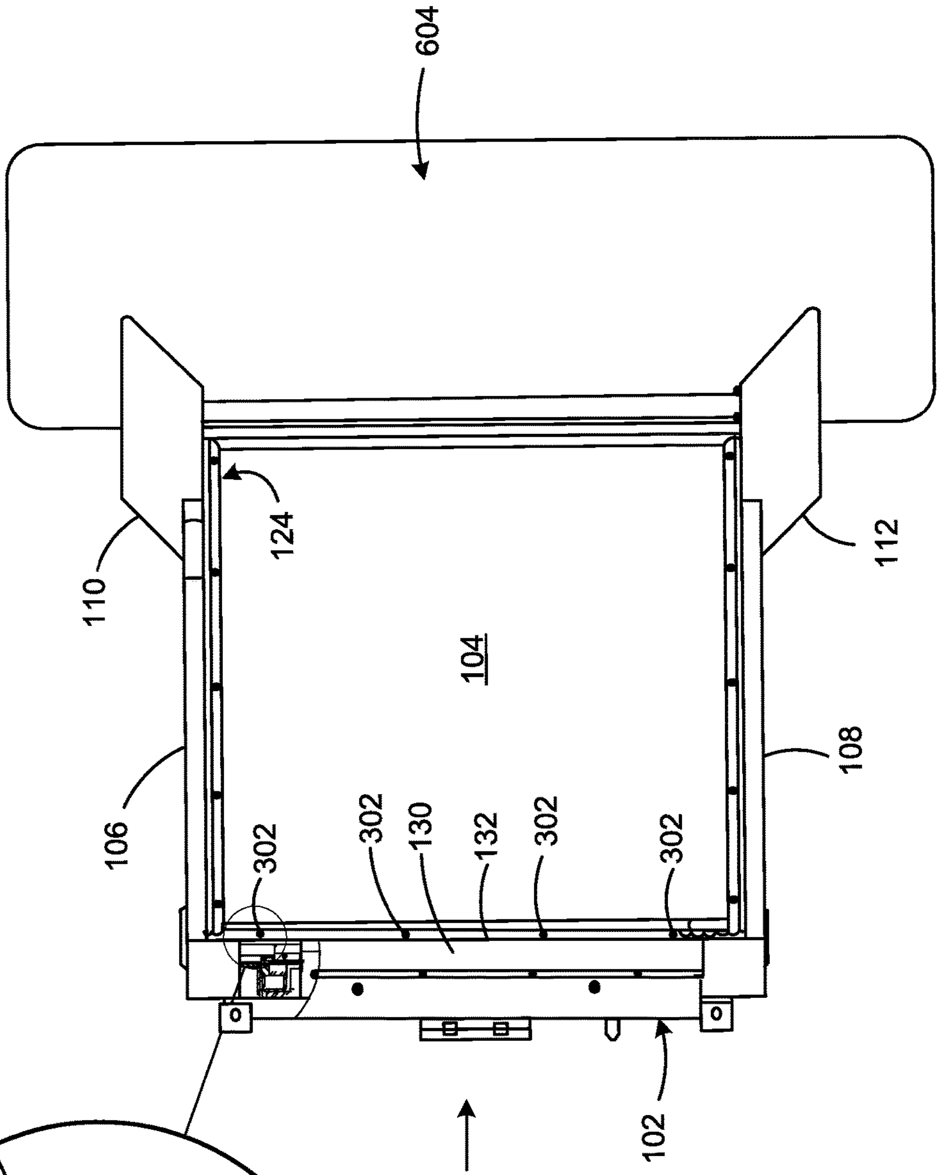
FIG. 5A is a top, partial cut-away view, of the vertical lift shown in FIG. 1.
Figure 5B:
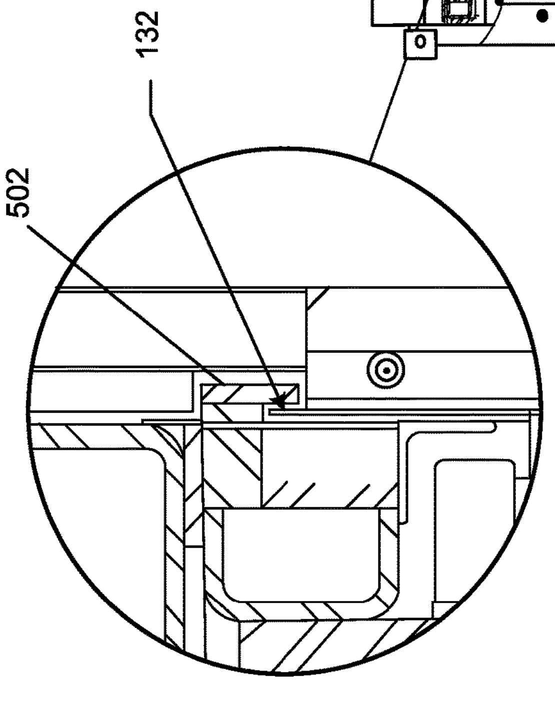
FIG. 5B is a detailed view of the encircled portion shown in FIG. 5A showing the roller shade and a roller shade guide.

The roller shade 132 may be coupled to the mast end 140 of the platform 104 along the width thereof using fasteners 302. With reference also to FIGS. 5A and 5B, roller shade guides 502 may be coupled to opposite sides adjacent to respective sides of the roller shade 132 and extend along the height of the mast 102. The roller shade guides 502 may define associated guide slots extending along the height of the mast 102 for guiding the ends of the roller shade 132 as it is extracted from the roller shade housing 130 and retracted into the roller shade housing 130 with movement of the platform 104 between the lowered and raised positions.

Figure 6:
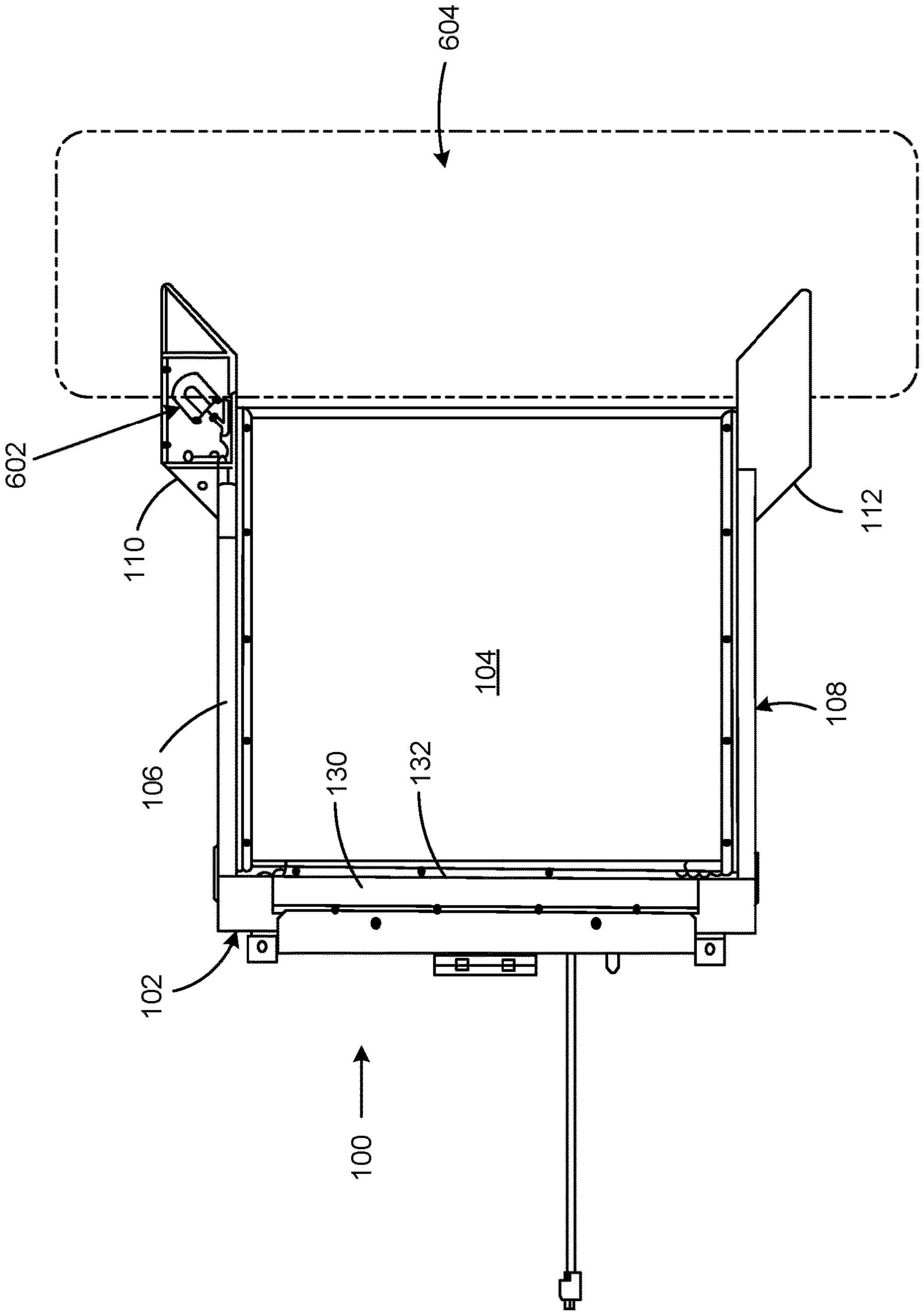
FIG. 6 is top, partial cut-away view of the vertical lift shown in FIG. 1.
Figure 7:
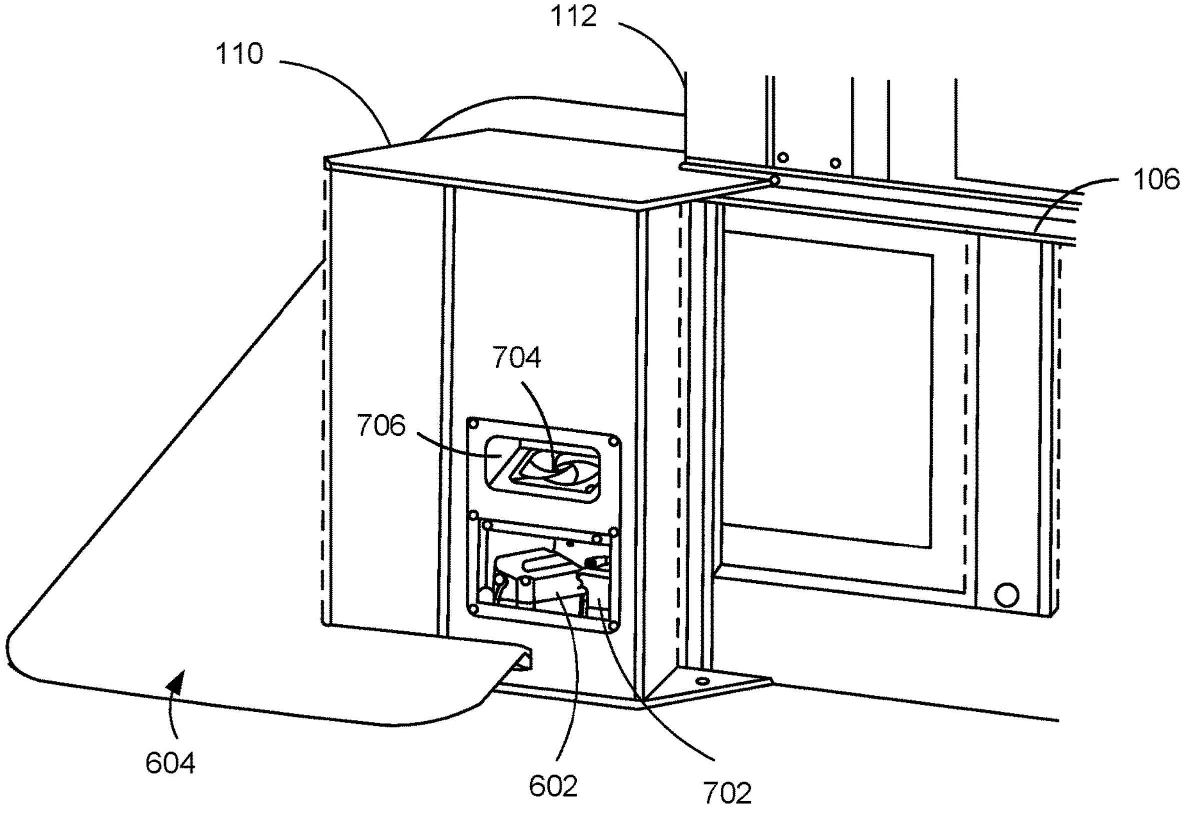
FIG. 7 is a right, side view of a portion of the vertical lift shown in FIG. 1.
Figures 8A, 8B:
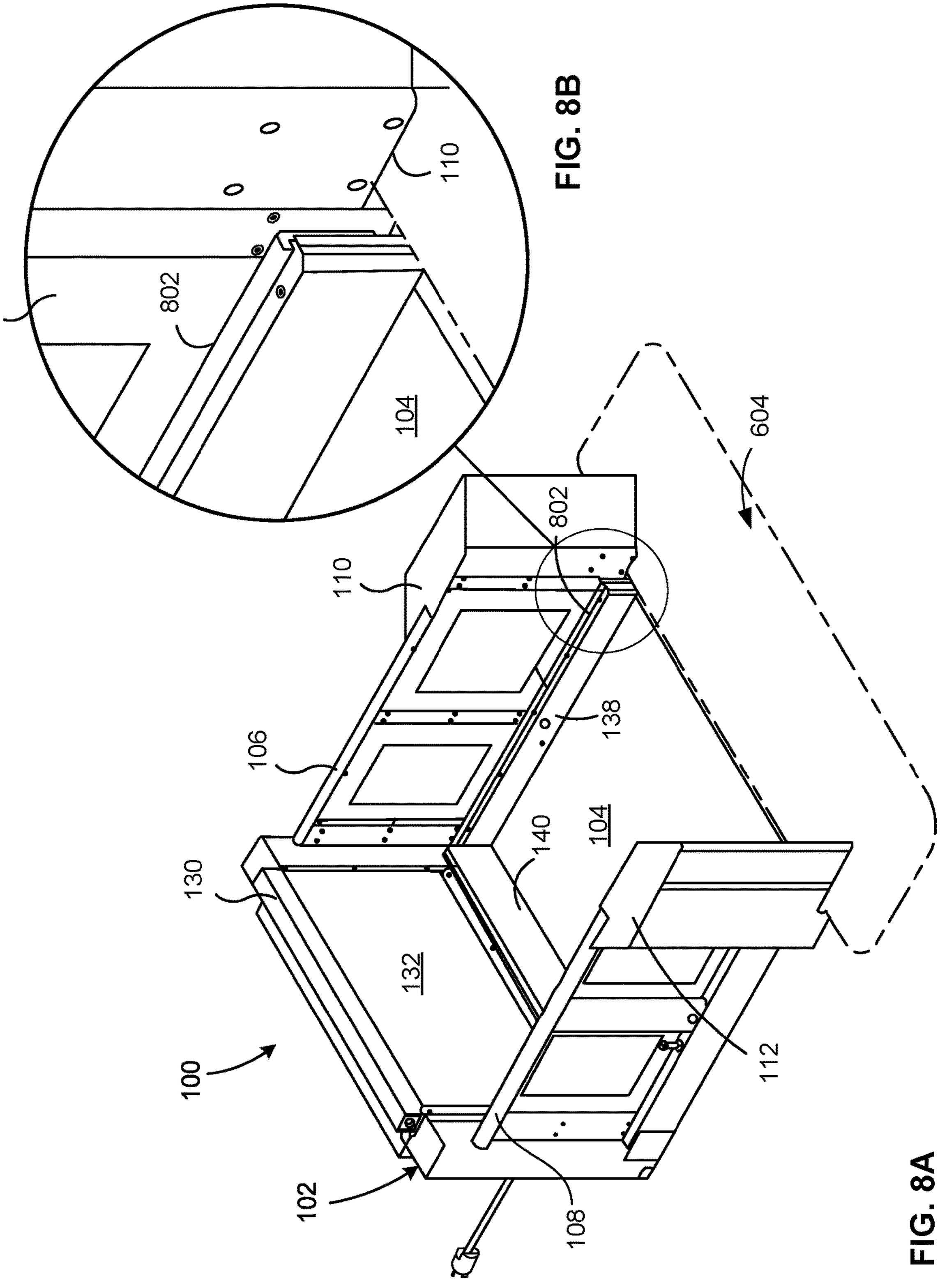
FIG. 8A is a top, perspective view of the vertical lift shown in FIG. 1.
FIG. 8B is a detailed view of the encircled portion shown in FIG. 8A.
Figure 9B:
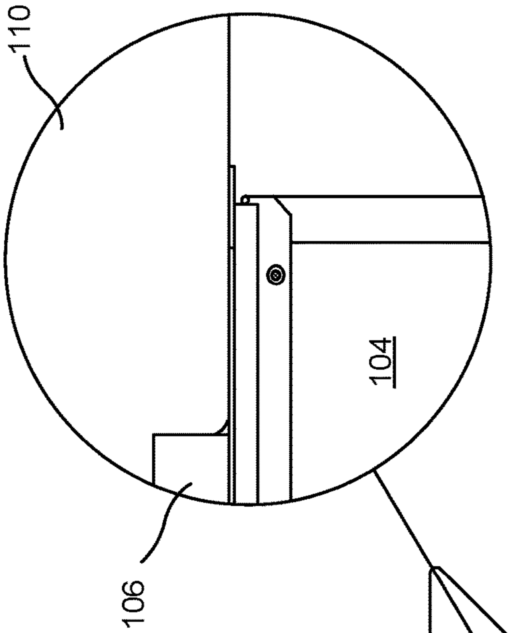
FIG. 9B is a detailed view of the encircled portion shown in FIG. 9A.
Figure 9A:
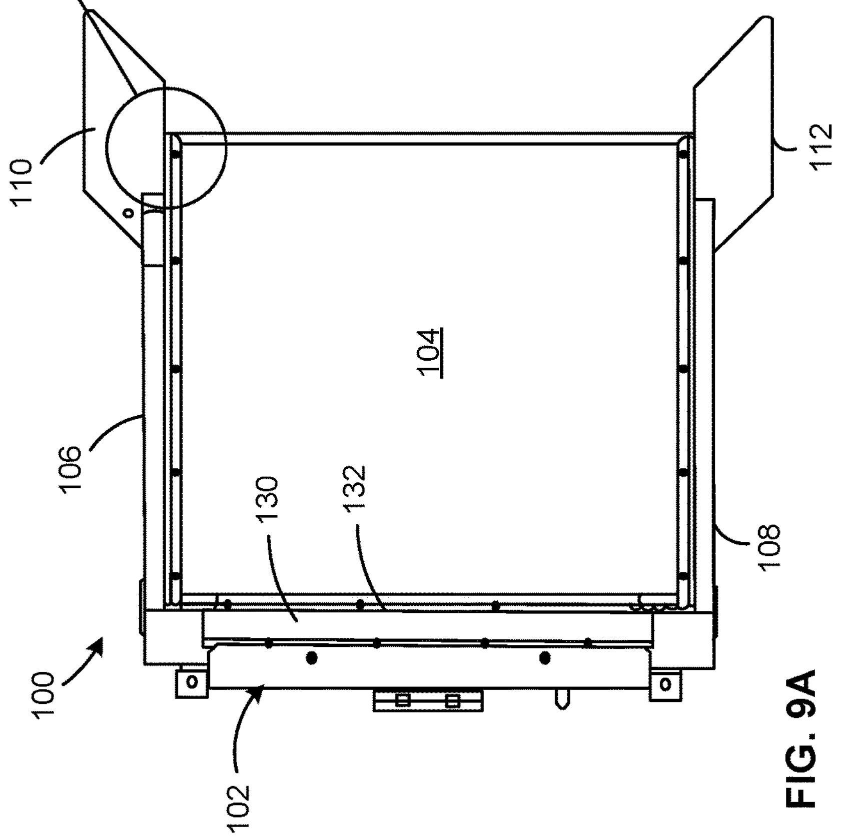
FIG. 9A is a top view of the vertical lift shown in FIG. 1.

Turning now to FIGS. 6 and 7, the illustrated example lift 100 also includes a scanner 602 for detecting presence of a person in a protected area of the lift 100. The scanner 602 may have a known configuration and may be positioned and configured to detect presence of a user in the protected area. If the scanner 602 detects a person in the protected area, the scanner 602 may provide a scanner output indicating a person has been detected in the protected area and, in response to the scanner output, operation of the lift 100 may be disabled. Disabling operation of the lift 100 in response to detection of a user in the protected area may reduce the possibility of injury to a person the during operation of the lift 100.

In the illustrated example embodiment, the scanner 602 is a known laser scanner disposed within a bottom of the right entrance guard and the protected area 604 is defined generally by the illustrated rectangular shape at the front entry of the lift 100. The laser scanner 602 transmits a laser output through an opening in the bottom of the right entrance guard and into in the protected area. The laser scanner 602 detects reflection the laser output from a person in the protected area. In the illustrated example embodiment, the protected area has a length that is greater than the width of the lift 100 and a width that extends forward of the front entry of the lift 100. In some embodiments, the protected area may have a length extending beyond the left and right side guard panel 108, 106 by 2 feet or more and beyond the left and right entrance guards 112, 110 by 1 foot or more, and may have a width extending forward from the front entry 128 of the lift 100 by 2 feet or more.

In some operating environments for the lift 100, dust or debris may possibly accumulate on the scanner 602 and interfere with operation of the scanner 602. To address this, and as shown for example in FIG. 7, in some embodiments a scanner window 702 may be provided an exterior surface of the housing in which the scanner 602 is placed, i.e., in the right side guard panel 106 in the illustrated example. The scanner window 702 may be positioned to allow a user to view the scanner 602 from a location exterior to the lift 100 to determine whether dust or other debris has accumulated on the scanner 602. If the user determines dust or debris has accumulated on the scanner 602 by viewing the scanner 602 through the scanner window 702, the user may disable operation of the lift 100 and clean the dust and debris from the scanner 602 before resuming operation.

In some embodiments, a fan 704 may be provided adjacent the scanner 602. The fan 704 may be positioned to force air over the scanner 602 to prevent dust from accumulating on the scanner 602. In the illustrated example embodiment, the fan 704 is disposed in the right side guard panel 106 and positioned above the scanner 602 to force air downward onto the scanner 602. A fan window 706 may be provided for viewing the fan 704 from the exterior of the lift 100 to allow a user to determine whether dust or debris has accumulated on the fan 704. If the user determines dust or debris has accumulated on the fan 704 by viewing the scanner 602 through the fan window 706, the user may disable operation of the lift 100 and clean the dust and debris from the fan 704 before resuming operation. The fan can also create a positive pressure which can reduce the likelihood of dust entering left and right entrance guards 112, 110.

In some embodiments a lift 100 consistent with the present disclosure may include floating spacers 802 for minimizing pinch points between moving and stationary components of the lift 100. As illustrated, for example in FIGS. 8A, 8B, 9A and 9B, floating spacers 802 may be provided between the left side guard panel 108 and the left side 136 of the platform 104 and between the right side guard panel 106 and the right side 138 of the platform 104. In the illustrated example embodiment, the floating spacers 802 may extend along the length of the left and right side panels 108, 106 of the platform 104 to substantially fill the spaces between the left side guard panel 108 and the left side 136 of the platform 104 and between the right side guard panel 106 and the right side 138 of the platform 104. The spacers 802 may be made of rigid material, e.g., an ultra-high molecular weight (UHMW) plastic. In some embodiments, the spacers 802 may be coupled to the left 136 and right 138 sides of the platform 104 to leave a space of less than ¼ inch between the spacer 802 and the and the left and right side guard panel 108, 106, respectively. In some embodiments, the spacers 802 may leave a space of about 1/16 of an inch between the spacers 802 and the left and right side guard panels 108, 106, respectively.

The floating spacers 802 may be coupled to the left 136 and right 138 sides of the platform 104 to move with the platform 104 between the lowered position and the raised position to minimize pinch points between the spacers 802 and the left and right side guard panel 108, 106 throughout the range of travel of the platform 104. In some embodiments, the spacers 802 may be spring biased against the left and right side guard panel 108, 106 to slide against surfaces of the left and right side guard panel 108, 106 during travel of the platform 104 between the raised and lowered positions.

Figure 10:
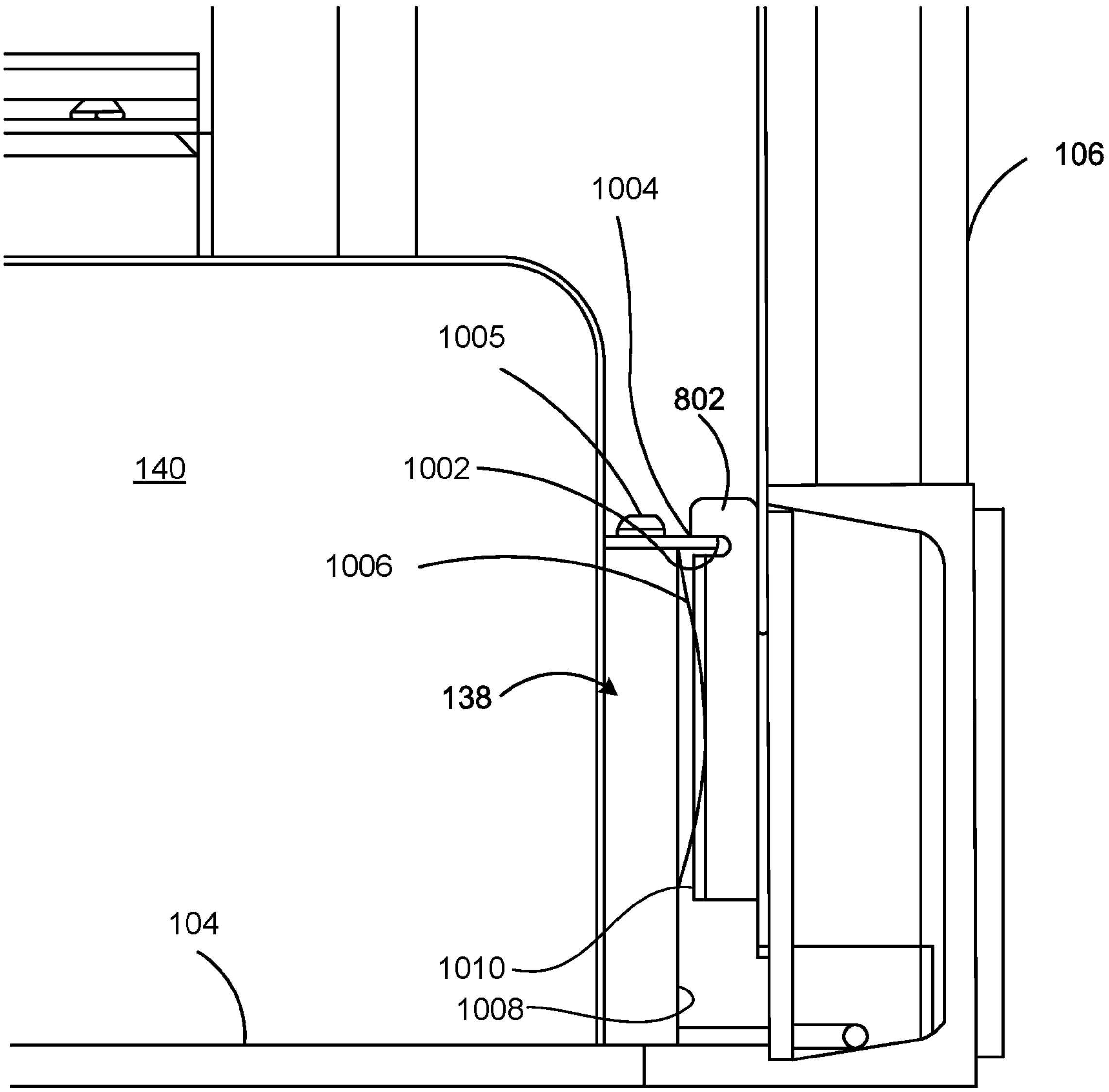
FIG. 10 is front, end view of a bottom portion of the rights side of the vertical lift shown in FIG. 1.

As shown in FIG. 10, for example, the spacer 802 may be coupled to the right side 138 of the platform 104 and positioned between the right side 138 of the platform 104 and the right side guard panel 106. The spacer 802 is generally rectangular in shape and has a width that is substantially that same as the width of a space between the right side 138 of the platform 104 and the right side guard panel 106. The spacer 802 may include a slot 1002 formed therein for receiving an extension arm 1004 extending from a the right side of the platform 104. In the illustrated example embodiment, the extension arm 1004 is a plate secured to the top of the right side 138 of the platform 104 using fasteners 1005 and extending along the length of the right side of the platform 104. The slot 1002 is formed adjacent the top of the spacer 802 and the extension arm 1004 extends laterally from the right side 138 of the platform 104 and into the slot 1002. The spacer 802 extends downward adjacent the outer surface of the right side 138 of the platform 104.

A leaf spring 1006 is coupled to the outer surface 1008 of the right side 138 of the platform 104 and engages an interior surface 1010 of the spacer 802. The leaf spring biases the spacer in a direction toward the right side guard panel 106. As the platform 104 and the spacer 802 move between the raised and lowered position, the leaf spring 1006 forces the spacer 802 against the right side guard panel 106 to minimize the space between the right side guard panel 106 and the spacer 802. This substantially blocks access to any pinch point between the moving platform 104 and spacer 802 and the right side guard panel 106. A spacer 802 as shown in FIG. 10 may be also provided on the left side of the platform 104.

In some embodiments, the side guard panels 106, 108 of a lift 100 consistent with the present disclosure may include viewing panels 1100. The viewing panels 1100 may allow a user to view, from a position external to the lift 100, the platform 104 in the lowered position and the area underneath the platform 104 when the platform 104 is in the raised position. In some embodiments, the viewing panels 1100 may be configured as windows. If a person is viewed by a user as being underneath the platform 104, a user can disable operation of the lift 100 until the person is no longer underneath the platform 104 to prevent possible injury to the user as the lift 100 is lowered from a raised position.

Figure 11B:
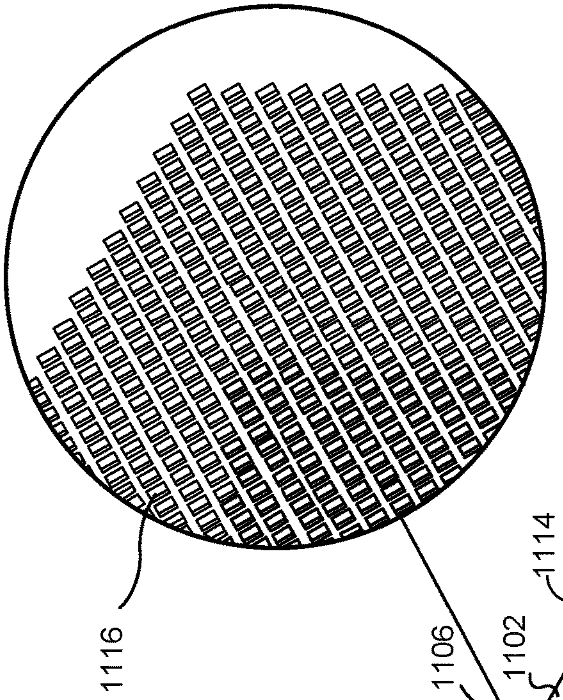
FIG. 11B is a detailed view of the encircled portion shown in FIG. 9A.
Figure 11A:
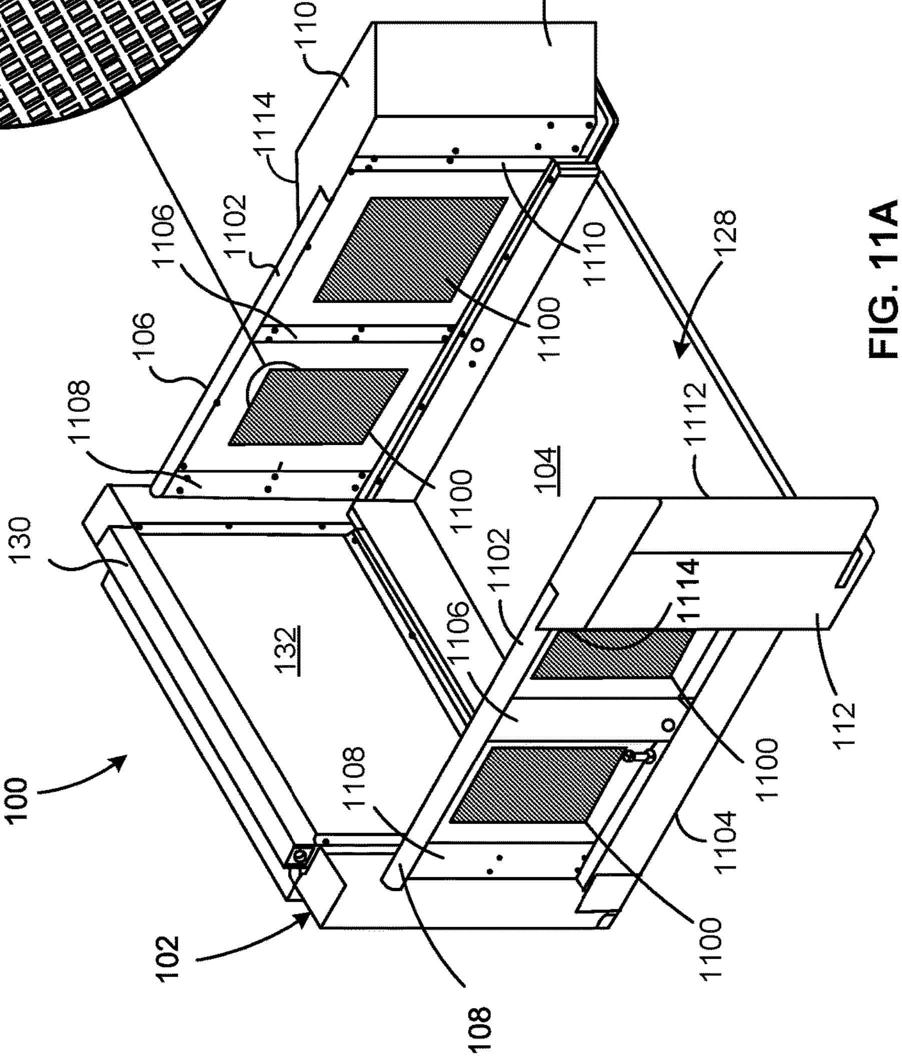
FIG. 11A is a top view of the vertical lift shown in FIG. 1.

In some embodiments, as shown for example in FIGS. 11A and 11B, each side panel 106, 108 may include an upper rail 1102, a lower rail 1104, a center column 1106, a first end column 1108 and a second end column 1110. A first viewing panel 1100 may be supported between the upper rail 1102, the lower rail 1104, the center column 1106 and the first end column 1108. A second viewing panel 1100 may be supported between the upper rail 1102, the lower rail 1104, the center column 1106 and the second end column 1110. The first and second viewing panels 1100 may be configured as perforated rigid members including perforations 1116 therethrough to allow viewing of the platform 104 and the area underneath the platform 104 from a position exterior to the lift 100.

In some embodiments, the entrance guards 110, 112 may be sized and shaped to keep people back and away from the front entry to the lift 100 to prevent them from reaching into the platform 104 area during operation. In some embodiments the entrance guards 110, 112 may extend laterally outward beyond the exterior surfaces of the side guard panels 106, 108 and forward beyond the entry of the lift 100. In some embodiments the entrance guards 110, 112 may extend laterally outward 1 foot or more beyond the exterior surfaces of the side guard panels 106, 108 and forward 1 foot or more beyond the entry 128 of the lift 100. The front surface 1112 of the entrance guards 110, 112 may be beveled inward toward the platform 104 to prevent people or material from catching on the entrance guards 110, 112 when entering or exiting the platform 104 area.

The entrance guards 110, 112 can take a variety of shapes and configurations and may extend along the entire height of the side guard panels. In the illustrated example embodiment, as shown for example in FIGS. 8A and 9A, the entrance guards 110, 112 generally extend the entire height of the side guard panels 106, 108 and are generally trapezoidally shaped. The entrance guards 110, 112 are constructed from a rigid frame with panels on each side to prevent a user from reaching through the entrance guards 110, 112. A front surface 1112 of each of the entrance guards 110, 112 is angled or beveled inward toward the front entry 128 of the lift 100, and a rear surface 1114 of each of the entrance guards 110, 112 is angled or beveled toward the associated side guard panel 106, 108 with a rear tip of the entrance guard 110, 112 positioned adjacent an exterior surface of the associated side guard panel 106, 108.

Figure 12:
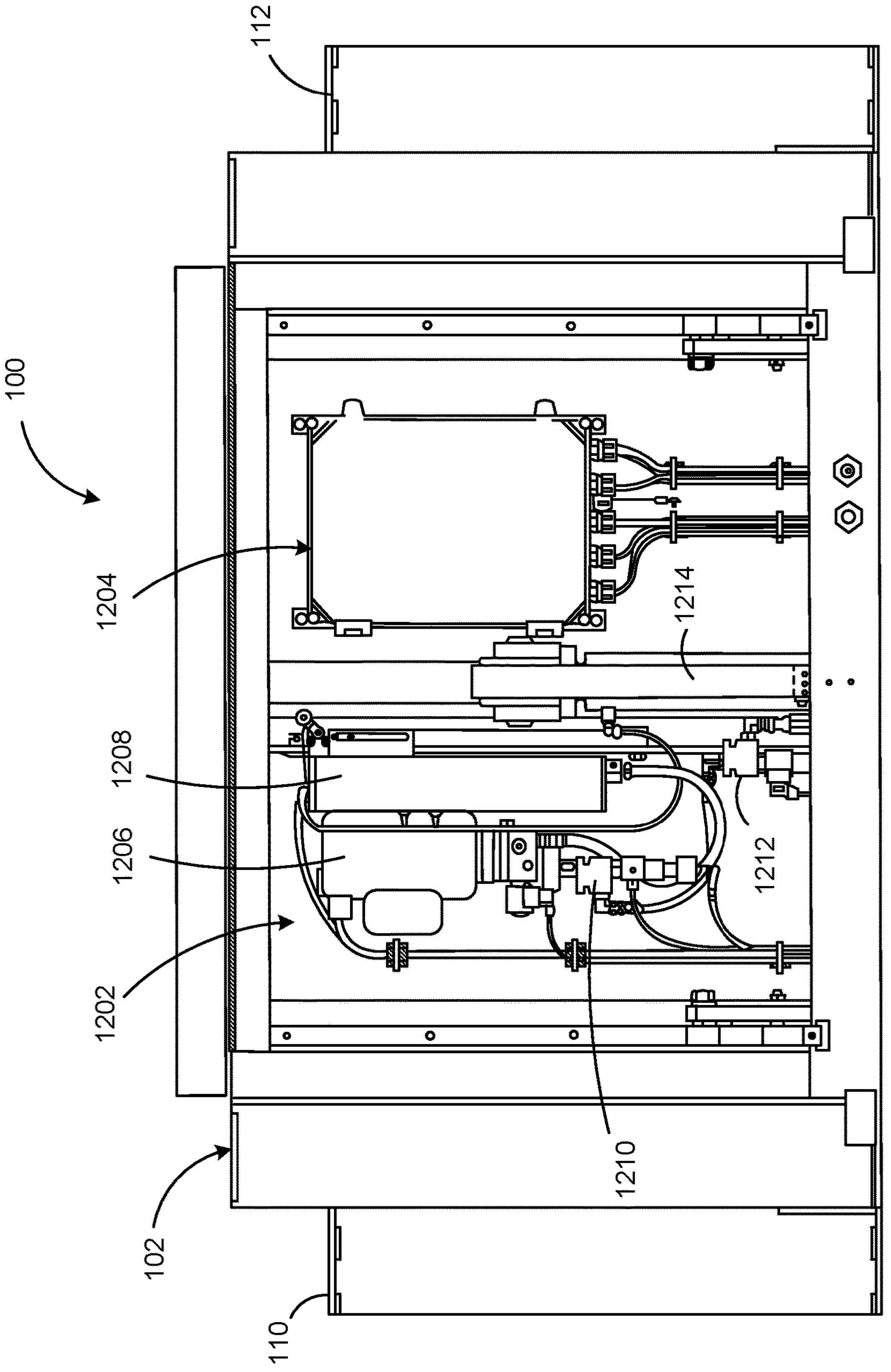
FIG. 12 is a rear view of the vertical lift shown in FIG. 1 with a rear panel removed.

In some embodiments, the power unit disposed in the mast 102 may include dual redundant locking valves to block fluid from unintentionally exiting the hydraulic cylinder, which would result in the platform 104 moving from the raised position to the lowered position. FIG. 12 for example shows the rear of the lift 100 with the rear panel of the mast 102 removed to expose the hydraulic power unit 1202 and the electrical interface 1204 for the lift 100. To reduce the possibility of injury by a person removing the rear panel of the mast 102 and contacting moving parts of the power unit or components of the electrical interface, the rear panel of the mast 102 may be secured to the mast 102 using tamper-resistant fasteners.

As shown, the power unit includes a pump 1206, a hydraulic fluid reservoir 1208, a first locking valve 1210, a second locking valve 1212, and a cylinder 1214. In a known manner the pump 1206 forces hydraulic fluid from the reservoir 1208 and into the cylinder 1214 to move the platform 104 to the raised position. To lower the platform 104 to the lowered position, the valves 1210, 1212 may be opened in response to a control signal from user controls and gravity force on the platform 104 forces fluid out of the cylinder 1214 and back into the reservoir 1208.

The first 1210 and second 1212 valves provide redundancy since fluid cannot exit the cylinder 1214 without both valves receiving the required control signal. In some embodiments, one or more of the control signals for opening the valves 1210, 1212 may be provided in response to the scanner output, thereby allowing the platform 104 to lower only when the scanner 602 does not detect a person in the protected area. This feature can prevent inadvertent lowering of the platform 104 onto a person positioned underneath the platform 104.

Figure 13:
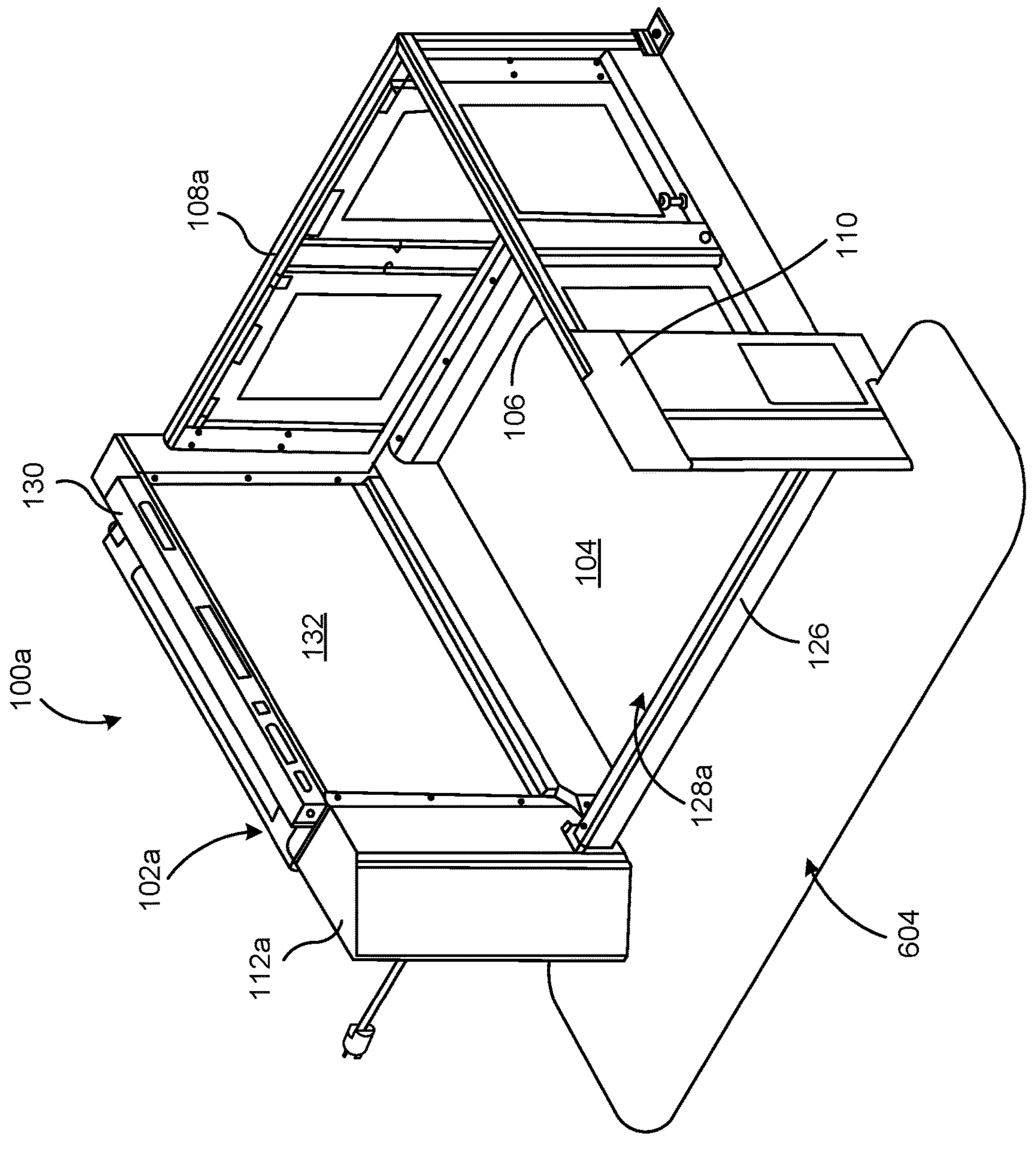
FIG. 13 is top perspective view of another example of a vertical lift consistent with the present disclosure with a platform in a lowered position.

FIG. 13 illustrates another example embodiment of a lift 100*a* consistent with the present disclosure configured as a side-entry vertical lift. The side-entry may be defined as any orientation whereby the mast is not opposite the entry point. The illustrated example embodiment includes a mast 102*a*, a platform 104, a right side guard panel 106, a rear side guard panel 108*a*, a right side entrance guard 110 and a left side entrance guard 112*a*. A first end of the mast 102*a* is coupled to a left side of the rear side guard panel, and a first end of the right side guard panel 106 is coupled to a right side of the rear side guard panel to enclose the platform 104 on three sides. The left side entrance guard 112*a* is coupled to a second end of the mast 102 and the right side entrance guard 110 is coupled to a second end of the right side guard panel 106. When the lift 100*a* is assembled, the lift 100*a* forms a rigid free-standing structure.

In the illustrated side-entry configuration, a side 128*a* of the lift 100*a* is open to allow access to the platform for loading and unloading material onto/from the platform. The mast 102*a* houses a power unit that uses hydraulic power for driving the platform 104 from a lowered position to a raised position. A user may selectively control operation of the power unit by operation of user controls placed on the exterior of the lift 100*a*, e.g., on the right side guard panel 106 or the rear side guard panel 108*a*, to place the platform 104 and any materials loaded thereon in the lowered position or the raised position.

According to one aspect of the present disclosure, there is thus provided a material handling lift. The material handling lift includes a mast, a platform coupled to the mast, a power unit configured to drive the platform along the mast to a raised position and lower the platform to a lowered position, and a roller shade having a first end coupled to a top of the mast and a second end coupled to the platform, the roller shade being configured to extend along a length of the mast when the platform is lowered to the lowered position and to retract toward the top of the mast when the platform is raised to the raised position.

According to another aspect of the present disclosure, there is thus provided a material handling lift. The material handling lift includes a power unit configured to drive a component of the material handling lift for moving an object, and a scanner positioned to scan a protected area adjacent the material handling lift for presence of a person and provide a scanner output if the person is detected in the protected area, the power unit being responsive to disable drive of the component in response to the scanner output.

According to yet another aspect of the present disclosure, there is thus provided a material handling lift. The material handling lift includes a mast, a platform coupled to the mast, a power unit configured to drive the platform along the mast to a raised position and lower the platform to a lowered position, at least one guard panel positioned adjacent a side of the platform, a spacer coupled to the side of the platform and at least partially disposed between the side of the platform and the at least one guard panel, and a spring coupled to the platform and configured to bias the spacer toward the at least one guard panel.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein.

It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The term "coupled" as used herein refers to any connection, coupling, link. Components described herein as "coupled" may be directly coupled to one another or may be indirectly coupled through intermediate components.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

The terms "comprising", "including" and "having" are intended to be inclusive and mean that there may be additional elements other than the listed elements.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

Spatially relative terms, such as "beneath," "below," "upper," "lower," "above" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

What is claimed is:

1. A material handling lift comprising:

a mast;

a platform coupled to the mast;

a power unit configured to drive the platform along the mast to a raised position and lower the platform to a lowered position; and a roller shade having a first end coupled to a top of the mast and a second end coupled to the platform, the roller shade being configured to extend along a length of the mast when the platform is lowered to the lowered position and to retract toward the top of the mast when the platform is raised to the raised position, wherein the roller shade is positioned to be drawn downward from the top of the mast by movement of the platform to extend along a front surface of the mast between the mast and the platform.

2. The material handling lift of claim 1, wherein the roller shade is constructed from a fabric.

3. The material handling lift of claim 1, wherein the roller shade further comprises:

a first end coupled to a roller that is rotatably mounted inside a roller shade housing;

a spring to bias the roller shade to roll around the roller and into the roller shade housing; and an opposite end of the roller shade coupled to the platform, wherein:

when the platform is in a raised position, the roller shade is substantially retracted within the roller shade housing; and as the platform is lowered to a lowered position, the roller shade is drawn from the roller shade housing by downward movement of the platform and is positioned between the platform and a front surface of the mast.

4. The material handling lift of claim 1, further comprising:

one or more roller shade guides coupled to opposite sides adjacent to respective sides of the roller shade and extending along a height of the mast;

wherein:

the one or more roller shade guides define associated guide slots extending along the height of the mast for guiding one or more ends of the roller shade as it is extracted from the roller shade housing and retracted into the roller shade housing with movement of the platform between a lowered position and a raised position.

5. The material handling lift of claim 1, further comprising:

at least one guard panel positioned adjacent to a side of the platform; and an entrance guard coupled to an end of the guard panel or an end of the mast, the entrance guard being shaped to force a user away from the side and front of an entry to the material handling lift.

6. The material handling lift of claim 5, wherein the least one guard panel is attached using tamper resistant fasteners.

7. The material handling lift of claim 6, wherein a front surface of the entrance guard is beveled inward toward the platform.

8. The material handling lift of claim 1, further comprising:

at least one guard panel positioned adjacent a side of the platform; and a viewing panel disposed in the at least one guard panel, the viewing panel comprising a rigid member with perforations therethrough for allowing viewing of a space under the platform when the platform is in the raised position.

9. A material handling lift comprising:

a mast;

a platform coupled to the mast;

a power unit configured to drive the platform along the mast to a raised position and lower the platform to a lowered position;

an entrance guard positioned at an entry to the material handling lift; and a scanner disposed within the entrance guard and positioned to scan a protected area adjacent the material handling lift and provide a scanner output indicating whether a person is in the protected area, the power unit being responsive to disable lowering of the platform to the lowered position in response to the scanner output when the scanner output indicates the person is in the protected area, wherein the protected area is defined forward of the entry to the material handling lift, wherein the scanner is disposed in a housing and the material handling lift further comprises a fan disposed in the housing adjacent the scanner to force air toward the scanner.

10. The material handling lift of claim 9, wherein the housing comprises a window in a side wall thereof for viewing the scanner.

11. The material handling lift of claim 9, wherein the scanner is a laser scanner.

12. The material handling lift of claim 9, wherein the protected area is wider than an entry to the material handling lift and extends forward of the entry to the material handling lift.

13. A material handling lift comprising:

a mast;

a platform coupled to the mast;

a power unit configured to drive the platform along the mast to a raised position and lower the platform to a lowered position;

an entrance guard positioned at an entry to the material handling lift; and a scanner disposed within the entrance guard and positioned to scan a protected area adjacent the material handling lift and provide a scanner output indicating whether a person is in the protected area, the power unit being responsive to disable lowering of the platform to the lowered position in response to the scanner output when the scanner output indicates the person is in the protected area, wherein the protected area is defined forward of the entry to the material handling lift, wherein the power unit comprises:

a hydraulic cylinder, a first locking valve for releasing fluid from the hydraulic cylinder in response to a first control signal, and a second locking valve for releasing fluid from the hydraulic cylinder in response to a second control signal.

14. The material handling lift of claim 13, wherein at least one of the first control signal or the second control signal is provided in response to the scanner output when the scanner output indicates the person is not in the protected area.

15. A material handling lift comprising:

a mast;

a platform coupled to the mast;

a power unit configured to drive the platform along the mast to a raised position and lower the platform to a lowered position;

at least one guard panel positioned adjacent a side of the platform, the at least one guard panel being stationary relative to the mast;

a spacer coupled to the side of the platform and at least partially disposed between the side of the platform and the at least one guard panel; and a spring coupled to the platform and configured to bias the spacer toward the at least one guard panel, the spacer configured to slide along the at least one guard panel as the platform moves vertically.

16. The material handling lift of claim 15, wherein the spacer is coupled to the side of the platform to leave a space of less than ¼ inch between the spacer and the guard panel.

17. The material handling lift of claim 15, wherein the spacer is coupled to the side of the platform to leave a space of about 1/16 of an inch between the spacer and the guard panel.

18. The material handling lift of claim 15, wherein the spacer is made of a rigid material.

19. The material handling lift of claim 18, wherein the rigid material is a plastic.

20. A material handling lift comprising:

a mast;

a platform coupled to the mast;

a power unit configured to drive the platform along the mast to a raised position and lower the platform to a lowered position; and a roller shade having a first end coupled to a top of the mast and a second end coupled to the platform, the roller shade being configured to extend along a length of the mast when the platform is lowered to the lowered position and to retract toward the top of the mast when the platform is raised to the raised position, wherein the roller shade further comprises:

a first end coupled to a roller that is rotatably mounted inside a roller shade housing;

a spring to bias the roller shade to roll around the roller and into the roller shade housing; and an opposite end of the roller shade coupled to the platform, wherein:

when the platform is in a raised position, the roller shade is substantially retracted within the roller shade housing; and as the platform is lowered to a lowered position, the roller shade is drawn from the roller shade housing by downward movement of the platform and is positioned between the platform and a front surface of the mast.

21. A material handling lift comprising:

a mast;

a platform coupled to the mast;

a power unit configured to drive the platform along the mast to a raised position and lower the platform to a lowered position;

a roller shade having a first end coupled to a top of the mast and a second end coupled to the platform, the roller shade being configured to extend along a length of the mast when the platform is lowered to the lowered position and to retract toward the top of the mast when the platform is raised to the raised position; and one or more roller shade guides coupled to opposite sides adjacent to respective sides of the roller shade and extending along a height of the mast;

wherein:

the one or more roller shade guides define associated guide slots extending along the height of the mast for guiding one or more ends of the roller shade as it is extracted from the roller shade housing and retracted into the roller shade housing with movement of the platform between a lowered position and a raised position.

22. A material handling lift comprising:

a mast;

a platform coupled to the mast;

a power unit configured to drive the platform along the mast to a raised position and lower the platform to a lowered position;

a roller shade having a first end coupled to a top of the mast and a second end coupled to the platform, the roller shade being configured to extend along a length of the mast when the platform is lowered to the lowered position and to retract toward the top of the mast when the platform is raised to the raised position;

at least one guard panel positioned adjacent to a side of the platform; and an entrance guard coupled to an end of the guard panel or an end of the mast, the entrance guard being shaped to force a user away from the side and front of an entry to the material handling lift.

23. The material handling lift of claim 22, wherein the least one guard panel is attached using tamper resistant fasteners.

24. The material handling lift of claim 23, wherein a front surface of the entrance guard is beveled inward toward the platform.

25. A material handling lift comprising:

a mast;

a platform coupled to the mast;

a power unit configured to drive the platform along the mast to a raised position and lower the platform to a lowered position;

a roller shade having a first end coupled to a top of the mast and a second end coupled to the platform, the roller shade being configured to extend along a length of the mast when the platform is lowered to the lowered position and to retract toward the top of the mast when the platform is raised to the raised position;

at least one guard panel positioned adjacent a side of the platform; and a viewing panel disposed in the at least one guard panel, the viewing panel comprising a rigid member with perforations therethrough for allowing viewing of a space under the platform when the platform is in the raised position.

* * * * *